United States Patent Office 3,148,289
Patented Sept. 8, 1964

3,148,289
ULTRASONIC TRANSDUCER
Hermanus Stephanus Josephus Pijls and Ulrich Ernst Enz, Eindhoven, Netherlands, assignors to North American Philips Company, Inc., New York, N.Y., a corporation of Delaware
Filed Sept. 24, 1959, Ser. No. 842,000
Claims priority, application Netherlands Sept. 30, 1958
10 Claims. (Cl. 310—8.1)

The present invention relates to an ultrasonic transducer. More particularly, the invention relates to a transducer of piezomagnetic or piezoelectric type in which the ultrasonic generator is controlled by a feedback control voltage produced by a plate of piezoelectric material positioned on the transducer.

When the plate of piezoelectric material is positioned in an area where it is driven substantially only by inertia forces, for example at one of the two head surfaces of a frame-shaped vibrating body, the inertia forces produce a deformation extending approximately linearly in the direction of the thickness of the plate and which is zero at the end of the plate. The voltage produced by the plate is thus proportional to the square of the thickness of the plate and is substantially zero when the thickness of the plate is relatively small.

In accordance with the present invention, a plate of piezoelectric material is positioned on the vibrating body of the transducer in a zone of strain. The plate produces a control voltage which is applied to the generator for energizing vibration producing means for the vibrating body and serves to control the frequency and amplitude of the vibrations of the vibrating body.

The plate of piezoelectric material is preferably positioned on the vibrating body at the middle in the zone of maximum strain in the proximity of a deformation loop. This provides a deformation in the plate which is substantially constant and which is equal to the maximum deformation of the vibrating body.

In order that the invention may be readily carried into effect, it will now be described with reference to the accompanying drawing, wherein.

Figure 1:
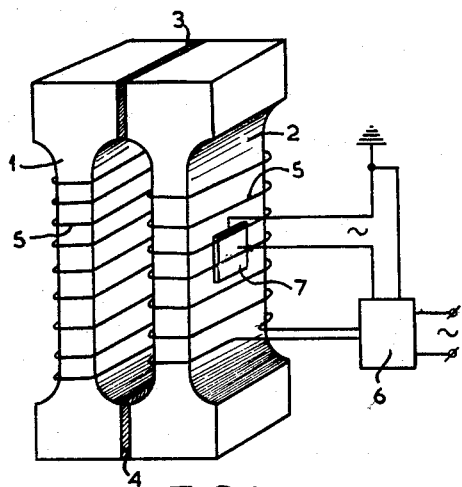
FIG. 1 is a perspective view of an embodiment of the ultrasonic transducer of the present invention.

In FIG. 1, the transducer is of the piezomagnetic type. The transducer of FIG. 1 comprises two I-shaped vibrating bodies 1 and 2 of magnetostrictive material. The vibrating bodies 1 and 2 may comprise, for example, Ferroxcube (a commercial ferrite fully described in U.S. Patents 2,452,529, 2,452,530, 2,452,531). Plates 3 and 4 of permanent magnetic material are positioned between the vibrating bodies 1 and 2. The plates 3 and 4 may comprise, for example, Ferroxdure (a commercial ferrite fully described in U.S. Patents 2,762,777 and 2,762,778). A winding 5 constitutes means for producing vibrations in the vibrating bodies 1 and 2. The winding 5 is energized by a generator 6.

A feedback circuit is provided for controlling the frequency and amplitude of the vibrations of the vibrating bodies 1 and 2. The feedback circuit comprises a plate 7 of piezoelectric material which produces a control voltage applied to the generator 6, as shown in the figure. In accordance with the present invention, the plate 7 of piezoelectric material is fixed in position on the vibrating body 2 in a zone of maximum strain in the proximity of a deformation loop. Of course, the plate 7 may be positioned on the vibrating body 1, instead of on the body 2, if it is positioned in a zone of maximum strain in the proximity of a deformation loop.

Figure 2:
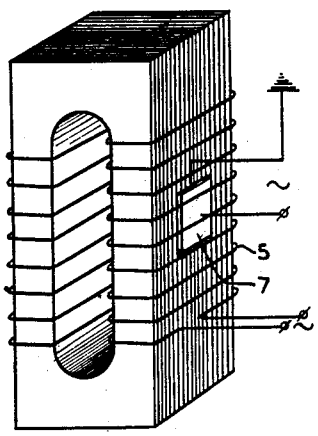
FIG. 2 is a perspective view of another embodiment of the ultarsonic transducer of the present invention.

FIG. 2 shows a frame-shaped laminated metallic transducer of magnetostrictive type, which may, of course, comprise a unitary vibrating body instead of the laminations indicated. The transducer of FIG. 2 cannot be operated at its maximum permissible power because metal will have a larger deformation than the piezoelectric material of plate 7.

The feedback circuit provided for controlling the frequency and amplitude of the vibrations of the vibrating body comprises the plate 7 of piezoelectric material which produces a control voltage applied to the generator 6 (not shown in FIG. 2). In accordance with the present invention, the plate 7 of piezoelectric material is fixed in a position on the vibrating body in a zone of maximum strain in the proximity of a deformation loop.

Figure 3A:
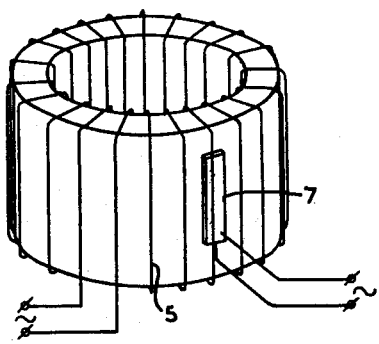
FIGS. 3a and 3b are perspective views of another embodiment of the ultrasonic transducer of the present invention.
Figure 3B:
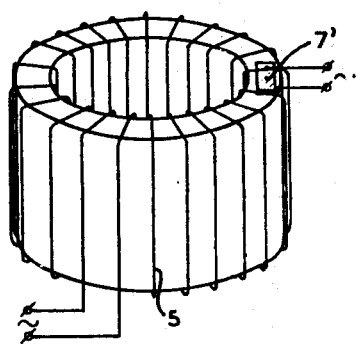

FIGS. 3a and 3b are embodiments of a radially vibrating magnetostrictive ring. The feedback circuit provided for controlling the frequency and amplitude of the vibrations of the vibrating body comprises a plate 7, FIG. 3a, or 7', FIG. 3b, of piezoelectric material which produces a control voltage applied to the generator (not shown in FIGS. 3a and 3b). In accordance with the present invention, the plate 7 or the plate 7' of piezoelectric material is positioned on the vibrating body in a zone of maximum strain in the proximity of a deformation loop.

The plate 7 may be positioned on a non-radiating wall. A non-radiating wall may be provided by suspending a wall in foam rubber.

Figure 4:
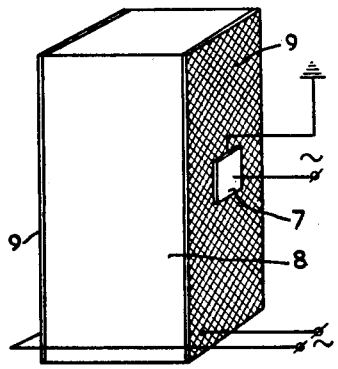
FIG. 4 is a perspective view of another embodiment of the ultrasonic transducer of the present invention.

In FIG. 4 the transducer is of the piezoelectric type. The transducer of FIG. 4 comprises a block-shaped vibrating body 8 of piezoelectric material. The vibrating body 8 may comprise, for example, barium titanate. Electrodes 9 constitute means for producing vibrations in the vibrating body 8. The electrodes 9 are energized by a generator (not shown in FIG. 4).

A feedback circuit is provided for controlling the frequency and amplitude of the vibrations of the vibrating body 8. The feedback circuit comprises a plate 7 of piezoelectric material which produces a control voltage applied to the generator (not shown in FIG. 4). In accordance with the present invention, the plate 7 of piezoelectric material is positioned on the vibrating body 8 in a zone of maximum strain in the proximity of a deformation loop. In the embodiment of FIG. 4, the plate 7 is positioned on an electrode 9.

In the device of FIG. 4, a slot may be provided in the block type vibrating body 8 to form a frame type vibrating body, similar to that shown in FIG. 2. When this is done, the electrodes 9 are interconnected to constitute one pole of the transducer and an electrode or electrodes (not shown in FIG. 4) are provided on the inside of the slot and constitute the other pole of the transducer.

In the embodiments of FIGS. 1, 2, 3a, 3b and 4, the plate 7 (or 7', in FIG. 3b) is thin relative to the body on which it is positioned and may be secured to such body by a suitable cement. The plate is made thin relative to the body on which it is positioned in order to avoid asymmetry of said body.

Relatively thicker plates 7 may be utilized if the symmetry of the vibrating body is maintained. Thus, in FIG. 5, a pair of plates 12 and 13, of relatively greater thickness than that of the plate 7 (or 7', in FIG. 3b) of FIGS. 1, 2, 3a, 3b and 4, is utilized.

Figure 5:
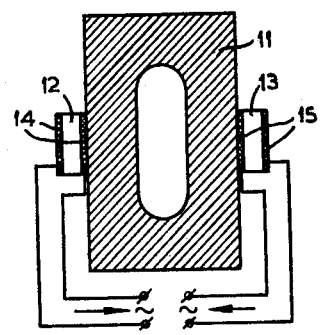
FIG. 5 is a sectional view of still another embodiment of the ultrasonic transducer of the present invention.

In FIG. 5, the transducer is of piezoelectric type. The transducer of FIG. 5 comprises a frame-shaped vibrating body 11 of piezoelectric material. Electrodes 14 and 15 constitute means for producing vibrations in the vibrating body 11. The electrodes 14 and 15 are energized by a generator (not shown in FIG. 5).

A feedback circuit is provided for controlling the frequency and amplitude of the vibrations of the vibrating body 11. The feedback circuit comprises the pair of plates 12 and 13 of piezoelectric material which produce control voltages. The plates 12 and 13 are positioned symmetrically, one on each side of the vibrating body 11. In accordance with the present invention, the plates 12 and 13 are each positioned on the vibrating body 11 in a zone of maximum strain in the proximity of a deformation loop.

The plate 12 is positioned between the pair of electrodes 14 and the plate 13 is positioned between the pair of electrodes 15. The electrodes 14 and 15 may be connected so that the control voltage produced by the electrodes 14 and the control voltage produced by the electrodes 15 are in phase opposition. The phase-opposed control voltage may then be applied to a push-pull generator stage (not shown in FIG. 5).

The plates 12 and 13 may have a remanent electric polarization. The arrows indicate this remanent polarization and the axial direction of the crystal.

If the transducers of the present invention are to be utilized in electrically conductive liquids the piezoelectric plates may be housed in fluid or liquid-tight envelopes.

While the invention has been described by means of specific examples and in specific embodiments, we do not wish to be limited thereto, for obvious modifications will occur to those skilled in the art without departing from the spirit and scope of the invention.

What is claimed is:

1. An ultrasonic transducer comprising a vibrating body, means for producing vibrations in said vibrating body, a generator for energizing said vibration producing means and feedback circuit means for controlling the frequency and amplitude of said vibrations, said feedback circuit means comprising a plate of piezoelectric material of substantially small dimension relative to said body to prevent asymmetrical operation thereof positioned on the surface of said vibrating body in a zone of maximum strain, said plate being caused to vibrate in a plane substantially parallel to said surface of said vibrating body thereby producing a control voltage, and means for applying said control voltage to said generator.

2. An ultrasonic transducer comprising a vibrating body, means for producing vibrations in said vibrating body, a generator for energizing said vibration producing means and feedback circuit means for controlling the frequency and amplitude of said vibrations, said feedback circuit means comprising a plate of piezoelectric material of substantially small dimension relative to said body to prevent asymmetrical loading thereto positioned on the surface of said vibrating body at the midsection thereof in the zone of maximum strain, said plate being caused to vibrate in a plane substantially parallel to said surface of said vibrating body thereby producing a control voltage, and means for applying said control voltage to said generator.

3. An ultrasonic transducer comprising a vibrating body, said vibrating body comprising at least a pair of substantially I-shaped magnetostrictive members positioned adjacent each other, winding means on said members for producing vibrations in said vibrating body, a generator for energizing said winding means and feedback circuit means for controlling the frequency and amplitude of said vibrations, said feedback circuit means comprising a plate of piezoelectric material of substantially small dimension relative to said body to prevent asymmetrical vibration of said body and positioned on the surface of one of said members in a zone of maximum strain, said plate being caused to vibrate in a plane substantially parallel to said surface of said vibrating body thereby producing a control voltage, and means for applying said control voltage to said generator.

4. An ultrasonic transducer comprising a vibrating body, said vibrating body comprising a plurality of frame-shaped magnetostrictive laminations positioned in stacked relation to each other, winding means on said stacked laminations for producing vibrations in said vibrating body, a generator for energizing said winding means and feedback circuit means for controlling the frequency and amplitude of said vibrations, said feedback circuit means comprising a plate of piezoelectric material of substantially small dimension relative to said body to prevent asymmetrical operation thereof positioned on the surface of said vibrating body in a zone of maximum strain, said plate being caused to vibrate in a plane substantially parallel to said surface of said vibrating body thereby producing a control voltage, and means for applying said control voltage to said generator.

5. An ultrasonic transducer comprising a vibrating body, said vibrating body comprising a magnetostrictive ring, winding means on said ring for producing radial vibrations in said vibrating body, a generator for energizing said winding means and feedback circuit means for controlling the frequency and amplitude of said vibrations, said feedback circuit means comprising a plate of piezoelectric material of substantially small dimension relative to said body to prevent asymmetrical operation thereof positioned on the surface of said ring in a zone of maximum strain, said plate being caused to vibrate in a plane substantially parallel to said surface of said vibrating body thereby producing a control voltage, and means for applying said control voltage to said generator.

6. An ultrasonic transducer comprising a vibrating body, said vibrating body comprising a substantially block-shaped piezoelectric member, electrode means on said member for producing vibrations in said vibrating body, a generator for energizing said electrode means and feedback circuit means for controlling the frequency and amplitude of said vibrations, said feedback circuit means comprising a plate of piezoelectric material of substantially small dimension relative to said body to prevent asymmetrical operation thereof positioned on the surface of said electrode means in a zone of maximum strain, said plate being caused to vibrate in a plane substantially parallel to said surface of said vibrating body thereby producing a control voltage, and means for applying said control voltage to said generator.

7. An ultrasonic transducer comprising a vibrating body, means for producing vibrations in said vibrating body, a generator for energizing said vibration producing means and feedback circuit means for controlling the frequency and amplitude of said vibrations, said feedback circuit means comprising at least one plate of piezoelectric material of small mass to prevent asymmetrical vibration of said body and symmetrically secured to the surface of said vibrating body in a zone of maximum strain, said plate being caused to vibrate in a direction transverse to its thickness dimension and substantially parallel to said surface of said vibrating body thereby producing control voltages, and means for applying said control voltages to said generator.

8. An ultrasonic transducer comprising a vibrating body, said vibrating body comprising a frame-shaped piezoelectric member, electrode means on said member for producing vibrations in said vibrating body, a generator for energizing said electrode means and feedback circuit means for controlling the frequency and amplitude of said vibrations, said feedback circuit means comprising a pair of plates of piezoelectric material of substantially small dimension relative to said body to prevent asymmetrical operation thereof symmetrically positioned each on a separate surface of said member each in a zone of maximum strain, said plates being caused to vibrate in a plane substantially parallel to said surface of said vibrating body thereby producing control voltages, and means for applying said control voltages to said generator.

9. An ultrasonic transducer comprising a vibrating body, said vibrating body comprising a frame-shaped piezoelectric member, electrode means on said member for producing vibrations in said vibrating body, said electrode means comprising first and second pairs of electrodes, a generator for energizing said electrode means and feedback circuit means comprising first and second plates of piezoelectric material of substantially small dimension relative to said body to prevent asymmetrical operation thereof symmetrically positioned each on a separate surface of said member each in a zone of maximum strain, said first and second plates being caused to vibrate in a plane substantially parallel to said surface of said vibrating body thereby producing control voltages, said first plate being positioned between said first pair of electrodes and said second plate being positioned between said second pair of electrodes, and means for applying said control voltages to said generator.

10. A transducer according to claim 3 with the addition of permanent magnet means positioned between the extremities of said adjacent magnetostrictive members.

References Cited in the file of this patent

UNITED STATES PATENTS

| | | |
|---|---|---|
| 2,616,223 | Jonker | Nov. 4, 1952 |
| 2,636,135 | Peek | Apr. 21, 1953 |
| 2,806,328 | Bradfield | Sept. 17, 1957 |
| 3,044,028 | Harris | June 10, 1962 |

FOREIGN PATENTS

| | | |
|---|---|---|
| 758,631 | Great Britain | Oct. 10, 1956 |